United States Patent
Tayeb et al.

(10) Patent No.: US 11,436,291 B1
(45) Date of Patent: Sep. 6, 2022

(54) SOURCE RANK METRIC OF MEASURING SOURCES OF INFLUENCE

(71) Applicant: Intuit Inc., Mountain View, CA (US)

(72) Inventors: Yaakov Tayeb, Petah Tikva (IL); Hadar Lackritz, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/829,173

(22) Filed: May 31, 2022

(51) Int. Cl.
*G06F 16/9536* (2019.01)
*G06F 16/9535* (2019.01)
*G06F 16/951* (2019.01)
*G06Q 50/00* (2012.01)

(52) U.S. Cl.
CPC ........ *G06F 16/9536* (2019.01); *G06F 16/951* (2019.01); *G06F 16/9535* (2019.01); *G06Q 50/01* (2013.01)

(58) Field of Classification Search
CPC ............. G06F 16/9536; G06F 16/9535; G06F 16/951; G06F 16/01; G06Q 50/01
See application file for complete search history.

(56) References Cited

U.S. PATENT DOCUMENTS

2020/0167347 A1* 5/2020 Yu ..................... G06F 16/9024

OTHER PUBLICATIONS

Brin, S. et al.,"The Anatomy of a Large-Scale Hypertextual Web Search Engine", Computer Networks and ISDN Systems vol. 30, Issues 1-7, Apr. 1998, pp. 107-117 (20 pages).

* cited by examiner

*Primary Examiner* — Etienne P Leroux
(74) *Attorney, Agent, or Firm* — Ferguson Braswell Fraser Kubasta PC

(57) ABSTRACT

A method implements a source rank metric of measuring sources of influence. The method includes processing transactions to generate a graph. The method further includes processing the graph to select nodes. A node is identified as one or more of a source node and a destination node of an edge of the graph. The method further includes processing source ranks, of the nodes, to update the source ranks. A source rank is calculated using a subset of indegree values and a subset of outdegree edges. The method further presenting identifiers, of multiple entities represented by the nodes, sorted using the source ranks.

20 Claims, 6 Drawing Sheets

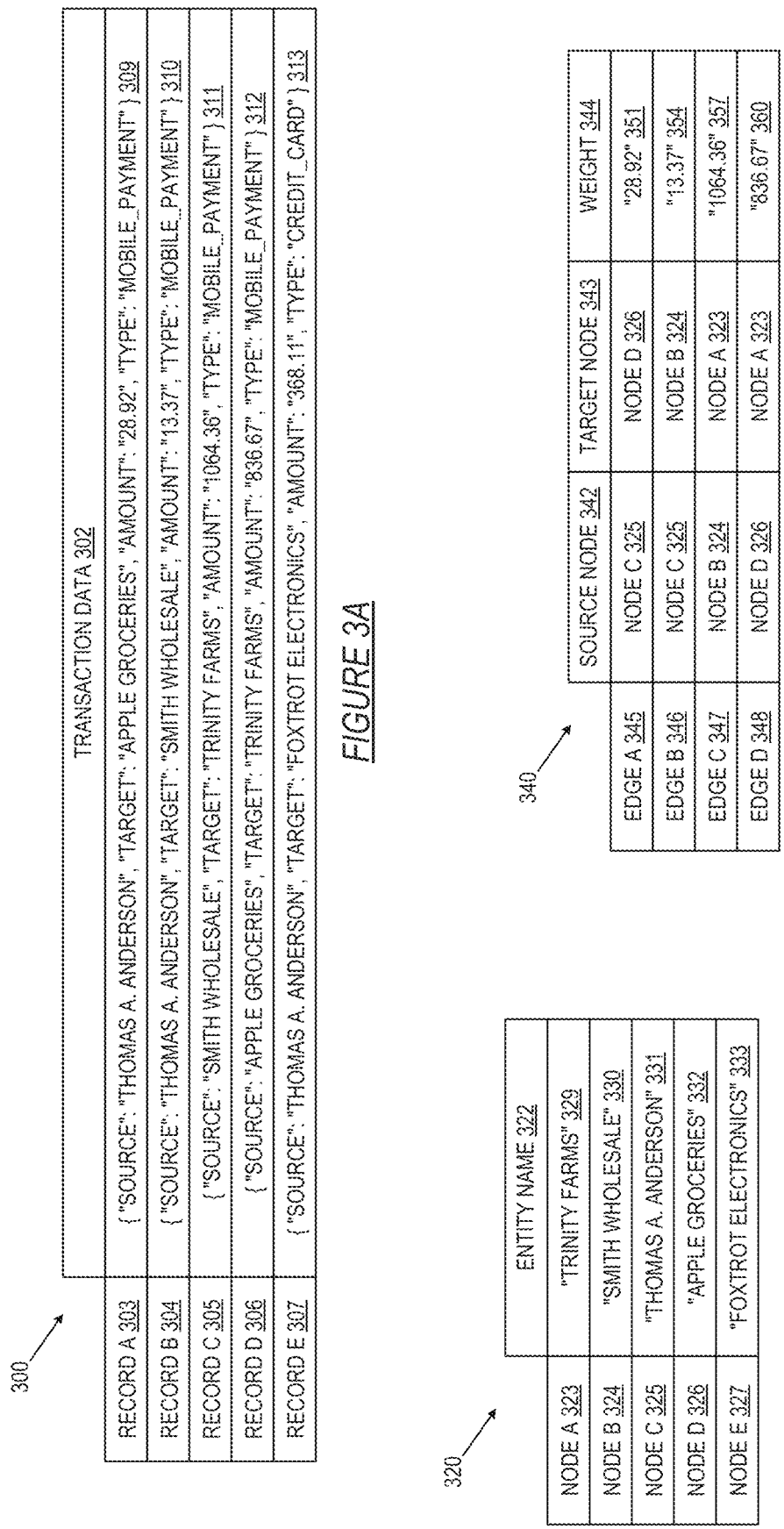

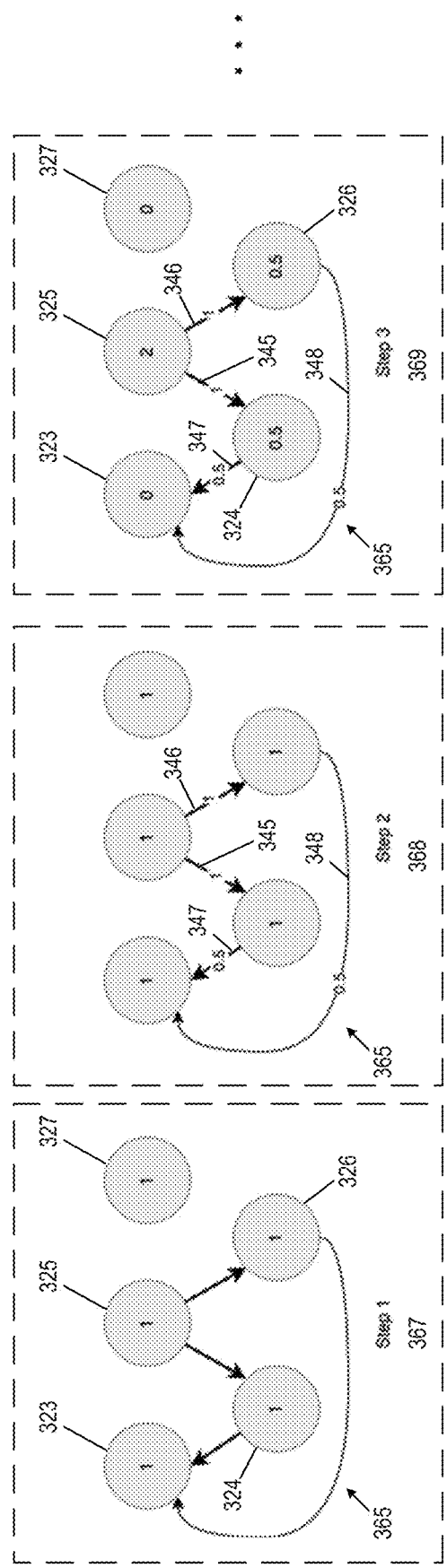

SOURCE RANK METRIC OF MEASURING SOURCES OF INFLUENCE

BACKGROUND

Influencers have the power to affect the habits or quantifiable actions of others. For example, social media influencers may upload original content, which may be sponsored, to social media platforms to influence the followers of the influencers.

Currently, the magnitude of influence cannot be properly measured. Centrality measures that can be used to approximate a measure of influence include betweenness centrality, closeness centrality, and PageRank.

With the closeness centrality algorithm and the betweenness centrality algorithm, the score (i.e., the measure of influence) is defined to reflect the current amount of information that flows through any specific node. In betweenness centrality, the score reflects the number of shortest paths that go through the node while in closeness centrality, the score reflects the average distance from that node to the other nodes in the graph. The closeness and betweenness centrality algorithms do not focus on the relationship between nodes let alone the source and destination of these relationship flows.

The PageRank formula attributes importance to a node when other important nodes link to the node using outdegree value to rank nodes. The more nodes that link to a particular node (i.e., the more indegree edges there are for the particular node) the more important the particular node is. Additionally, PageRank relates to web browsing and includes a "transportation" variable which represents the change to get to a site without any link. With PageRank, there is no weight with regard to the source of the flow, which can lead to imprecise measurements.

SUMMARY

In general, in one or more aspects, the disclosure relates to a method implementing a source rank metric of measuring sources of influence. The method includes processing transactions to generate a graph. The method further includes processing the graph to select nodes. A node is identified as one or more of a source node and a destination node of an edge of the graph. The method further includes processing source ranks, of the nodes, to update the source ranks. A source rank is calculated using a subset of indegree values and a subset of outdegree edges. The method further presenting identifiers, of multiple entities represented by the nodes, sorted using the source ranks.

In general, in one or more aspects, the disclosure relates to a system implementing a source rank metric of measuring sources of influence. The system includes a graph controller configured to process a plurality of transactions. The system further includes an interface controller configured to generate a response that includes multiple identifiers. The system further includes a modeling application executing on one or more servers. The modeling application is configured for processing, by the graph controller, the transactions to generate a graph, which is a directed graph. The modeling application is configured for processing the graph to select a nodes. The modeling application is configured for processing a plurality of source ranks, of the nodes, to update the source ranks. A source rank of a is calculated using a subset of indegree values and a subset of outdegree edges. The system further includes a server application executing on one or more servers configured for presenting, by the interface controller, the identifiers sorted using the source ranks.

In general, in one or more aspects, the disclosure relates to a method using a source rank metric of measuring sources of influence. The method includes transmitting a request. The method further includes displaying identifiers received in a response to the request, wherein the identifiers are sorted using source ranks. The source ranks are generated by processing a plurality of transactions to generate a graph that is a directed graph. The graph is processed to select multiple nodes of the graph. Source ranks, of the nodes, are processed to update the source ranks. A source rank of a node is calculated using a subset of indegree values and a subset of outdegree edges.

Other aspects of the invention will be apparent from the following description and the appended claims.

BRIEF DESCRIPTION OF DRAWINGS

FIG. 3A, FIG. 3B, FIG. 3C, FIG. 3D, and FIG. 3E show examples in accordance with disclosed embodiments.

DETAILED DESCRIPTION

Figure 1A:
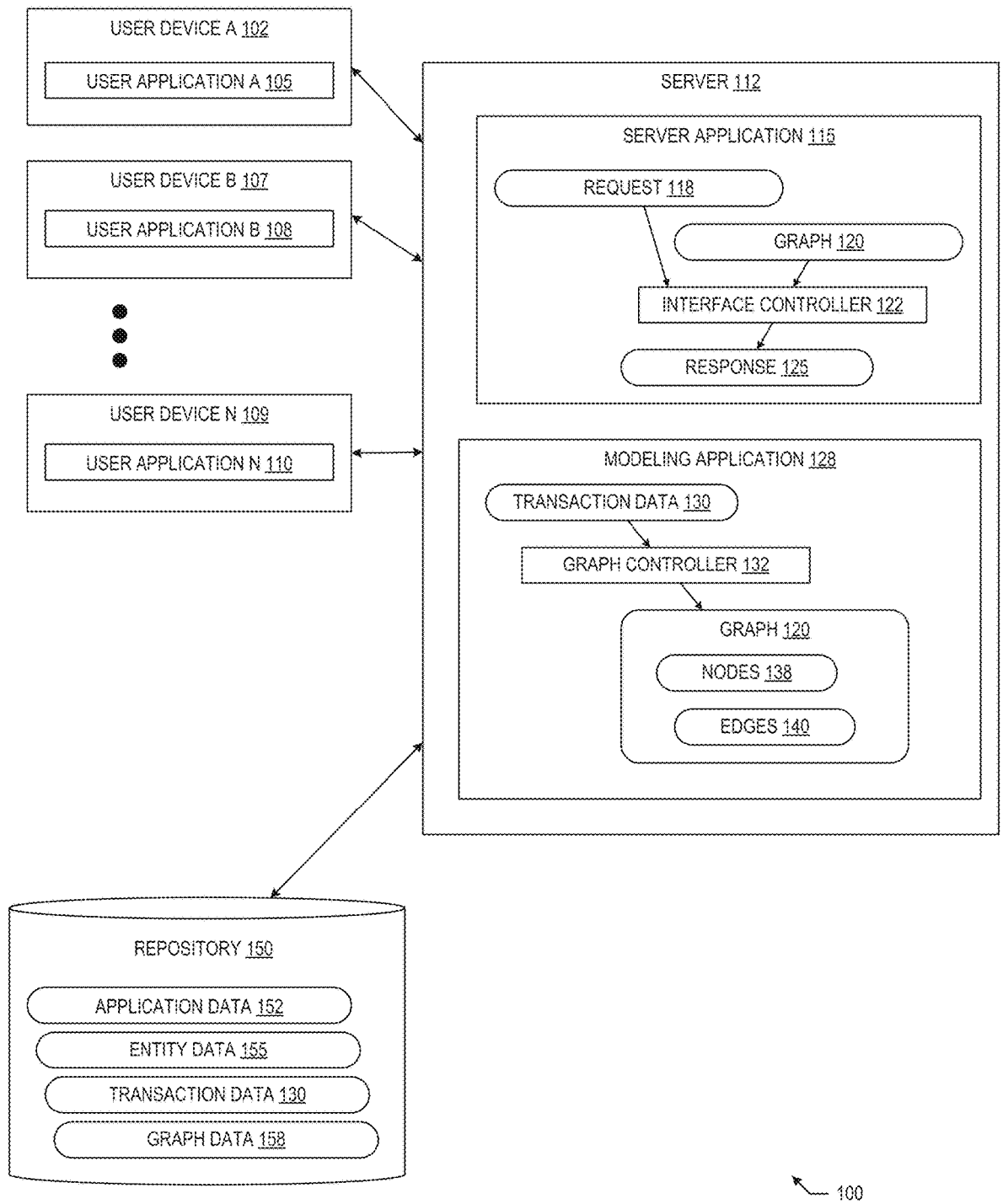
FIG. 1A, FIG. 1B, and FIG. 1C show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure implement a source rank metric of measuring sources of influence to identify influences from transactions. With the source rank algorithm, indegree values are used to rank nodes. The more nodes that have been affected by a particular node, the more important the particular node is. With the source rank algorithm, the source node of influence and its impact on other nodes is measured. Isolated nodes without any outdegree edges will have the value of zero due to their lack of effect on other nodes.

To implement the source rank algorithm, the system ingests transaction data and maps the transactions to nodes and edges (or links) of a graph. The graph is a directed graph with edges that point in one direction between different nodes. An edge that points (or flows) from a first node to a second node is an outdegree edge of the first node (i.e., "points out" from the first node) and is an indegree edge of the second node (i.e., "points in" to the second node). Each edge may have a value. The value of an edge may be referred to as an indegree value for a node to which the edge is an indegree edge (i.e., that "points in" to the node). Conversely, the same value may be referred to as an outdegree value for a node to which the edge is an outdegree edge (i.e., that "points out" from the node). The nodes of the graph represent the entities of the transactions (e.g., payor, payee, etc.). The edges represent the transactions and may be weighted by the amounts of the transactions.

After generating the graph, the source rank algorithm is applied to the graph to identify source ranks (i.e., measures of influence) for the nodes of the graph. Source rank uses indegree values to measure influence. The source rank of a node may identify the strength of the influence of the node as compared to the other nodes of the graph. The entities that correspond to nodes with higher source ranks have more influence than entities that correspond to nodes with lower source ranks. Entities with high source ranks may then be targeted to drive the adoption of products and services. For example, a system that analyzes thousands to millions of transactions for thousands to millions of entities, may identify the entities in a geographical area with the top ten source ranks. The system may then send messages, notifications, etc., to the top ten entities to help drive the adoption of products and services.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of machine learning for influence metrics and measurement. The various elements, systems, components, and steps shown in the figures may be omitted, repeated, combined, and/or altered as shown from the figures. Accordingly, the scope of the present disclosure should not be considered limited to the specific arrangements shown in the figures.

Turning to FIG. 1A, the system (100) implements a source rank metric of measuring sources of influence. The system (100) receives requests (e.g., the request (118)) and generates responses (e.g., the response (125)) using the graph (120). The system (100) generates graphs (e.g., the graph (120)) from records of transactions (e.g., the transaction data (130)) using a source rank algorithm that ranks nodes based on the transactions sourced by the entity represented by the node. The system (100) uses the graphs to generate source ranks that are used to sort the entities. The system (100) may display the sorted entities to users operating the user devices A (102) and B (107) through N (109). The system (100) includes the user devices A (102) and B (107) through N (109), the server (112), and the repository (150).

Figure 4A:
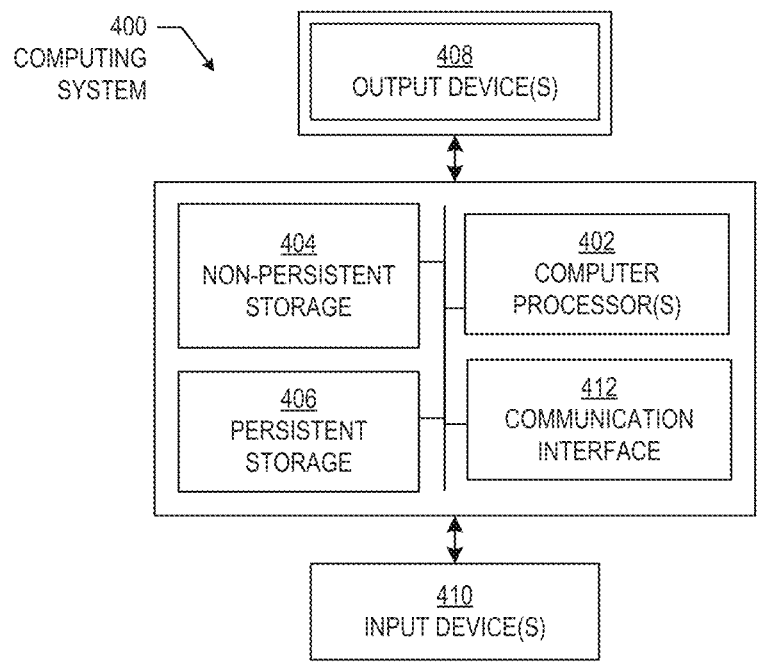
FIG. 4A and FIG. 4B show computing systems in accordance with disclosed embodiments.

The server (112) is a computing system (further described in FIG. 4A). The server (112) may include multiple physical and virtual computing systems that form part of a cloud computing environment. In one embodiment, execution of the programs and applications of the server (112) is distributed to multiple physical and virtual computing systems in the cloud computing environment. The server (112) includes the server application (115) and the modeling application (128).

The server application (115) is a collection of programs that may execute on multiple servers of a cloud environment, including the server (112). The server application (115) receives the request (118) and generates the response (125) based on the graph (120) using the interface controller (122). The server application (115) may host websites accessed by users of the user devices A (102) and B (107) through N (109) to view information from the graph (120). The websites hosted by the server application (115) may serve structured documents (hypertext markup language (HTML) pages, extensible markup language (XML) pages, JavaScript object notation (JSON) files and messages, etc.). The server application (115) includes the interface controller (122), which processes the request (118) using the graph (120).

The request (118) is a request from one of the user devices A (102) and B (107) through N (109). In one embodiment, the request (118) requests a list of entities (represented by the nodes (138) of the graph (120)) that are sorted by the source ranks of the entities. In one embodiment, the request (118) includes text that identifies the graph (120) from a set of graphs to use for ranking the entities of the list of entities. Additionally, the request (118) may specify additional filters for the list of entities. For example, the request (118) may specify a geographical area for the locations of the entities, threshold values for the amounts of transactions, types of platforms used to execute the transactions, etc. The structured text below (formatted in accordance with JSON) provides an example of the additional filters that may be included in the request (118) using key value pairs.

{
  "geographical area": "Florida, Texas",
  "minimum transaction value": "50.00",
  "maximum transaction value": "200.00",
  "platform": "mobile payment"
}

The graph (120) is generated with the modeling application (128), described further below. The graph (120) includes nodes and edges in which a node from the graph (120) corresponds to an entity identified in a record of a transaction from the transaction data (130) of the repository (150). An edge of the graph (120) corresponds to at least one transaction between two of the nodes of the graph (120). The graph (120) is a directed graph in which the edges identify a direction from one node to a subsequent node in the graph (120).

The interface controller (122) is a collection of programs that may operate on the server (112). The interface controller (122) processes the request (118) using the graph (120) to generate the response (125). In one embodiment, the interface controller (122) may generate the graph (120) "on demand" in response to receiving the request (118).

The response (125) is generated by the interface controller (122) in response to the request (118) using the graph (120). In one embodiment, the response (125) includes a list of identifiers, of corresponding entities, that is sorted by the source ranks of the nodes (which correspond to the entities) of the graph (120). The response (125) may be a string of structured text (e.g., JSON (JavaScript object notation) text) that uses keys and values to specify the identifiers, entities, source ranks, nodes, etc. The response (125) may further include information from the application data (152), the entity data (155), and the transaction data (130), which may be displayed to users of the user devices A (102) and B (107) through N (109).

The modeling application (128) is a collection of programs that may operate on the server (112). The modeling application (128) generates the graph (120) from the transaction data (130) using a graph controller (132).

The transaction data (130) is data that describes transactions. In one embodiment, the transactions are payment transactions between entities that are stored as electronic records. The entities of the transactions of the transaction data are mapped to the nodes (138) of the graph (120). The transactions of the transaction data are mapped to the edges (140). In one embodiment, the transaction data (130) used by the modeling application (128) is a subset of the transaction data (130) stored in the repository (150), which may be identified using information from the request (118).

The graph controller (132) generates the graph (120) from the transaction data (130). The graph controller (132) is a collection of programs that may operate on the server (112). For the transactions stored in the transaction data (130), the graph controller (132) identifies the nodes (138) and the edges (140), which is described further below with FIG. 1B.

The graph (120) is generated from the transaction data (130) and includes the nodes (138) and the edges (140). The node (138) represent entities that participate in transactions. For example, the entities may correspond to the payors and payees of payment transactions. The edges (140) identify pairs of entities (represented by the nodes (138)) that perform transactions. In one embodiment, one edge may correspond to one transaction. In one embodiment, one edge may correspond to multiple transactions.

The user devices A (102) and B (107) through N (109) are computing systems (further described in FIG. 4A). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the server (112) to access, manipulate, and view information, including information (e.g., source ranks) from the graph data (158). The user devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment, the user applications A (105) and B (108) through N (110) include web browser programs that display web pages from the server (112). In one embodiment, the user applications A (105) and B (108) through N (110) provide graphical user interfaces that display information stored in the repository (150).

As an example, the user application A (105) be used by a user to request a list of entities sorted by level of influence. The levels of influence of entities may be identified by the source ranks of the corresponding nodes from the graph (120). A list of entities sorted by the source ranks may be received and displayed by the user application A (105) to an operator of the user device A (120).

As another example, the user device N (109) may be used by a developer to maintain the software application hosted by the server (112). Developers may view the edges (140) of the graph (120) and make updates to the application data (152), the entity data (155), the transaction data (130) and the graph data (158) to correct errors or modify the application served to the users of the system (100).

The repository (150) is a computing system that may include multiple computing devices in accordance with the computing system (400) and the nodes (422) and (424) described below in FIGS. 4A and 4B. The repository (150) may be hosted by a cloud services provider that also hosts the server (112). The cloud services provider may provide hosting, virtualization, and data storage services as well as other cloud services and to operate and control the data, programs, and applications that store and retrieve data from the repository (150). The data in the repository (150) includes the application data (152), the entity data (155), the transaction data (130), and the graph data (158).

The application data (152) includes information that is accessed by users of the system (100). The application data (152) may include the source code files of an application (e.g., HTML files).

The entity data (155) includes information that describes the entities of transactions from the transaction data (130). The entities may be identified with identifiers that are unique to each entity. Entities may be individual persons, organizations, businesses, etc. The entity data (155) may include the identifiers as well as contact information, demographic information, geographic information, etc. The contact information may include names, addresses (physical and electronic), phone numbers, etc., of entities. The demographic information may include socioeconomic information including employment status, education, income, marriage status, etc. The geographic information may identify one or more locations that correspond to entities, including home addresses, business addresses, geographical regions, franchise locations and names, etc.

The transaction data (130) is data that describes transactions. The transactions may be described in electronic records that identify the entities of transactions and describe the exchanges of the transactions. In one embodiment, a transaction is a payment transaction between two entities transferring a payment amount between financial accounts of the entities.

The graph data (158) is data that describes the graphs (including the graph (120)) generated by the system (100). Multiple graphs may be generated from the transaction data (130) and stored to the graph data (158). Different graphs may be generated for different types of transactions. Different types of transactions include transactions that are made using mobile payments, a credit cards, cash, etc. In one embodiment, a graph may be generated for transactions that use mobile payments of a first mobile payment provider (e.g., Apple Pay®) and a different graph may be generated for transactions that use mobile payments of a different mobile payment provider (e.g., Android Pay®). Apple Pay® is a mobile payment system and is registered to Apple Inc. CORPORATION CALIFORNIA One Apple Park Way Cupertino CALIF. 95014. Android Pay® is a mobile payment system and is registered to GOOGLE LLC LIMITED LIABILITY COMPANY DELAWARE 1600 AMPHITHEATRE PARKWAY MOUNTAIN VIEW CALIF. 94043.

Although shown using distributed computing architectures and systems, other architectures and systems may be used. In one embodiment, the server application (115) may be part of a monolithic application that implements experiment result networks. In one embodiment, the user applications A (105) and B (108) through N (110) may be part of a monolithic applications that implement experiment result networks without the server application (115).

Figure 1B:
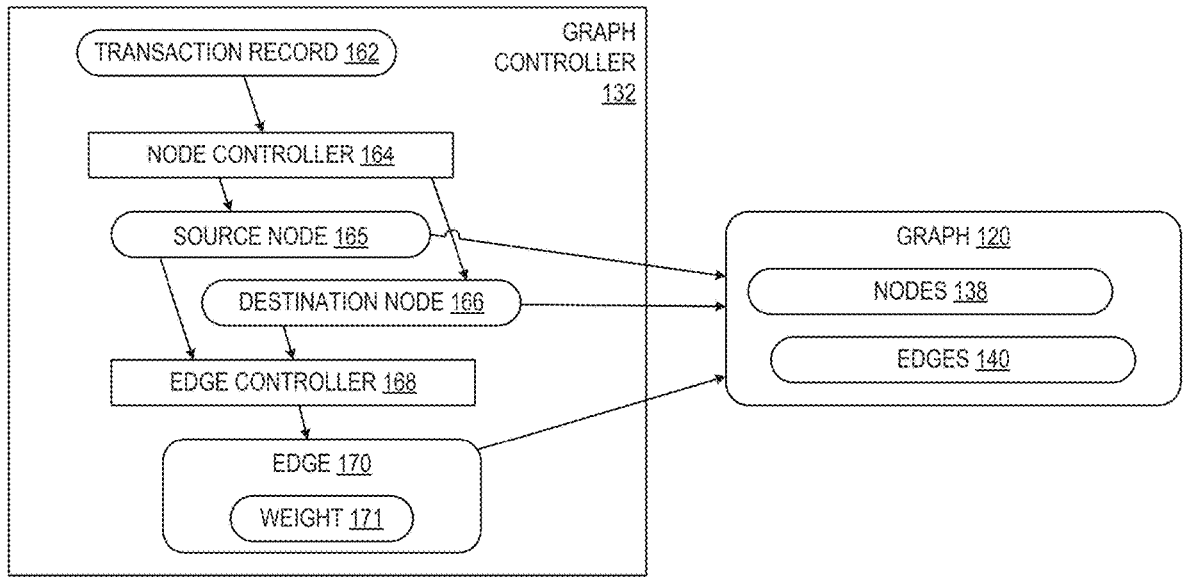

Turning to FIG. 1B, the graph controller (132) processes the transaction record (162) to update the graph (120). The graph controller (132) includes the node controller (164) and the edge controller (168).

The transaction record (162) is a record of a transaction from the transaction data (130) (of FIG. 1A). The transaction record (162) is input to the node controller (164). Different types of transactions may be analyzed by the system (100). In one embodiment, a transaction may be the transmission of data from a source to a destination. In one embodiment, a transaction may be a payment between a source entity and a destination entity.

The structured text below (formatted in accordance with JSON) provides an example of a payment transaction between an individual and a business.
{
  "Source": "Thomas A. Anderson",
  "Destination": "Apple Groceries",
  "Amount": "28.92",
  "Type": "mobile payment"
}

The structured text below (formatted in accordance with JSON) provides an example of a transaction transferring data over a satellite network between two computing systems (referred to as clusters).
{
  "Source": "US East Coast Cluster",
  "Destination": "Europe Cluster",
  "Amount": "130 GB",
  "Type": "satellite_transmission"
}

The node controller (164) is a program that may run as part of the graph controller (132). The node controller (164) identifies nodes from transactions. For example, the node controller (164) receives the transaction record (162) and identifies the source node (165) and the destination node (166). If the source node (165) and the destination node (166) are not present in the nodes (138) of the graph (120), then the node controller (164) adds the source node (165) and the destination node (166) to the nodes (138) of the graph (120).

The source node (165) and the destination node (166) represent the entities of a transaction. Entities may be individual persons, organizations, businesses, etc. Each entity may have a unique identifier (referred to as an entity identifier) used as a reference for the entity. The entity of the source node (165) is a source of the transaction (the payor of a payment, the sender of a data packet, etc.). The entity of the destination node (166) is a destination of a transaction (the payee of a payment, the receiver of a data packet, etc.).

The edge controller (168) is a program that may run as part of the graph controller (132). The edge controller (168) identifies the edge (170) from the source node (165) and the destination node (166). The edge controller (168) calculates the weights (e.g., the weight (171)) of the edges (140) of the graph (120). In one embodiment, each edge represents one transaction and the weight corresponds to the amount (payment amount, data transfer amount, etc.) of the transaction. In one embodiment, and edge may represent multiple transactions between the same nodes representing the same entities and the weight of the edge is a combination (e.g., a summation) of the amounts of the transactions.

The edge (170) is an edge between the source node (165) and the destination node (166). The edge (170) is a directed edge that starts from the source node (165) and ends at the destination node (166). If the edge (170) is not present in the edges (140) when the transaction record (162) is being processed, then the edge controller (168) adds the edge (170) to the edges (140) of the graph (120).

Figure 1C:
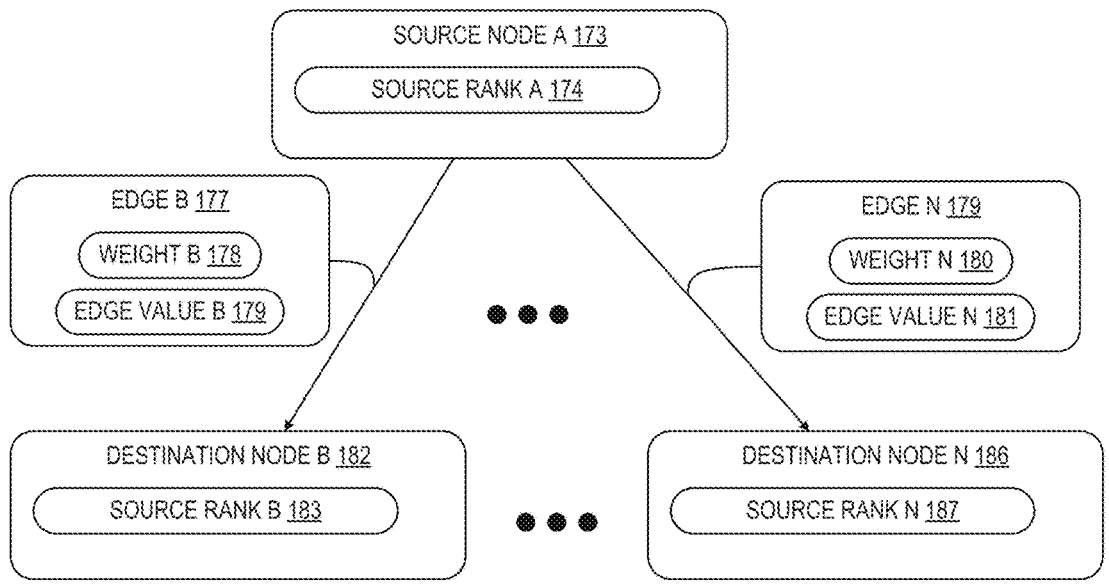

Turning to FIG. 1C, the source node A (173) and the destination nodes B (182) through N (186) are part of the nodes (138) (of FIG. 1A) of the graph (120) (of FIG. 1A). The edges B (177) through N (179) are part of the edges (140) of the graph (120). The edge B (177) connects from the source node A (173) to the destination node B (182). The edge N (179) connects from the source node A (173) to the destination node N (186).

The nodes A (173), B (182), and N (186) represent entities of transactions. The nodes A (173), B (182), and N (186) respectively include the source ranks A (174), B (182), and N (186).

The source ranks A (174), B (182), and N (186) are generated using a source rank algorithm The source rank algorithm identifies an amount of influence provided by the entities represented by the nodes of the graph.

The edges B (177) through N (179) represent transactions between the source node A (173) and the destination nodes B (182) and N (186). The edges B (177) through N (179) respectively include the weights B (178) through N (180) and include the edge values B (179) through N (181). The edges B (177) through N (179) are outdegree edges of the source node A (173) and are indegree edges of the destination nodes B (182) and N (186).

The weights B (178) through N (180) represent the values of transactions between the source node A (173) and the destination nodes B (182) and N (186). In one embodiment, the weights B (178) through N (180) may be set to 1. In one embodiment, the weights B (178) through N (180) may be set to the amounts of transactions represented by the respective edges B (177) through N (179). For example, the weight B (178) may have a value of 28.92 that represents the value of a transaction between the entities represented by the source node A (173) and the destination node B (182). In one embodiment, the weight B (178) may represent a combination (e.g., the sum) of transaction values between the entities represented by the source node A (173) and the destination node B (182).

The edge values B (179) through N (181) are intermediate values generated while processing the graph (120) (of FIG. 1B) to generate the source ranks A (174), B (182), and N (186). In one embodiment, the edge value B (179) generated with the In one embodiment, the edge values B (179) through N (181) and the source ranks A (174) and B (182) through N (186) are generated in accordance with Equation 1. Equation 1 uses a subset of indegree values (e.g., the edge values B (179) through N (181) that are indegree to the destination nodes B (182) through N (186)) and a subset of outdegree edges (e.g., the edges B (177) through N (179) that are outdegree from the source node A (173)). Equation 1 is distinguishable from equations of other algorithms that use a subset of outdegree values and a subset of indegree edges, i.e., the reverse order.

$$SR(A) = \frac{SR(S_1)}{C(S_1)} + \ldots + \frac{SR(S_n)}{C(S_n)} \qquad \text{Eq. 1}$$

In Equation 1, the function SR(A) is the source rank of node "A". The function C(S1) is an indegree count of node "S1". When each edge value is normalized to "1", the indegree count is a simple count of indegree edges to a node. When each edge value is weighted based on the transactions, the indegree count is proportional to the weight of an edge with respect to the sum of the indegree edge values of a node. For example, the edge value B (179) may be the source rank B (183) multiplied by the weight B (178) and divided by the sum of the weights of the indegree edges of the destination node B (182).

In one embodiment in accordance with Equation 1, a source rank is the sum of the edge values of the outdegree edges of the source node. For example, the source rank A (174) is the sum of the edge values B (179) through N (181) of the edges B (177) through N (179) of the source node A (173).

In one iteration, the source ranks for each of the nodes (138) (of FIG. 1B) of the graph (120) (of FIG. 1B) are calculated. Multiple iterations may be performed. The iterations may continue until a criterion is satisfied, e.g., when the sum of each change of each source rank is below a value of a change threshold.

Figure 2:
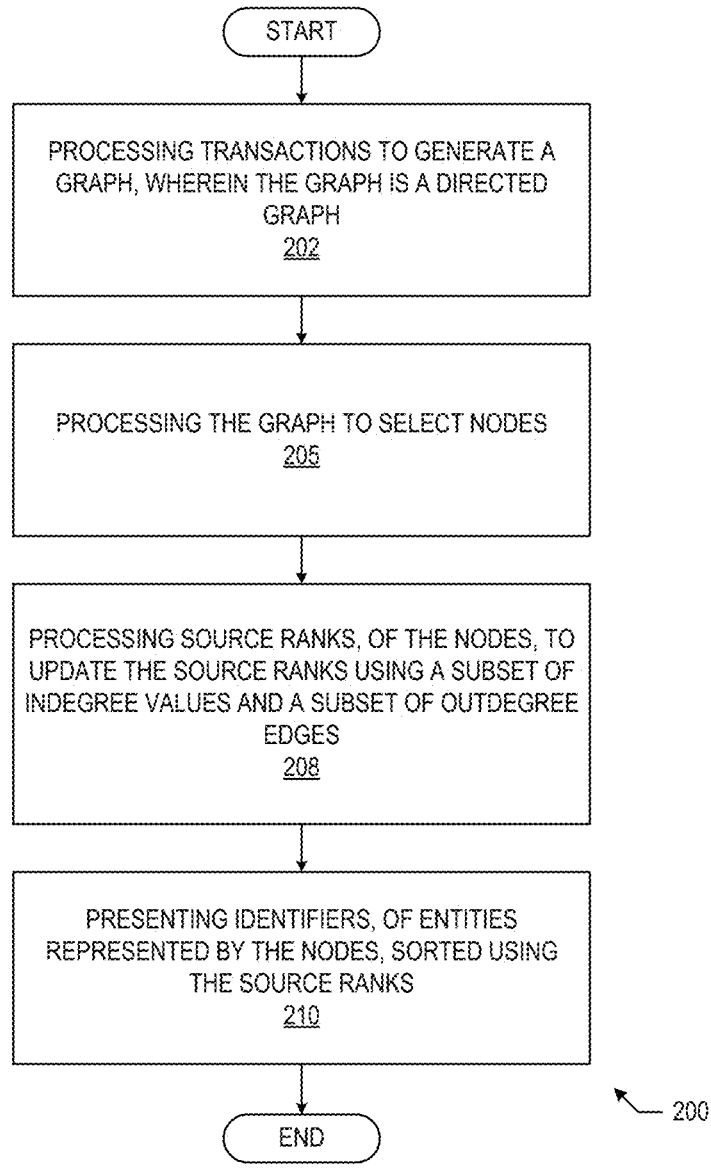
FIG. 2 shows a flowchart in accordance with disclosed embodiments.

Turning to FIG. 2, the process (200) implements a source rank metric of measuring sources of influence. The process (200) may be performed by a server.

At Step 202, transactions are processed to generate a graph, which is a directed graph. The transactions may number from thousands to millions of transactions and are processed by a computing system. In one embodiment, the transactions may be processed in response to receiving a request.

In one embodiment, a record of a transaction may include a text string name of an entity. The text string name may be used to search a database to locate an identifier for the entity (referred to as an entity identifier).

In one embodiment, processing the transactions includes mapping entities and transactions. The entities, identified in the transactions, are mapped to the nodes of the graph. The transactions are mapped to edges of the graph.

Mapping the entities to the nodes includes resolving the entity identifiers for the entities of the transactions. The entity identifiers are assigned to the nodes of the graph when the entity identifier has not previously been assigned to a node of the graph.

Mapping the transactions to edges includes selecting a weight for the edges. In one embodiment, each transaction corresponds to one edge and the weight of the edge may be a normalized value (e.g., "1") or a weighted value (e.g., the amount of the transaction). In one embodiment, an edge may correspond to multiple transactions between the same entities with a weight that is equal to a combination of (e.g., the sum of) the weights of the transactions.

In one embodiment, a transaction identifies a payment value from a source entity (represented by the source node) to a destination entity (represented by a destination node). In one embodiment, a transaction identifies an amount of data being transferred from source node to a destination node.

At Step 205, the graph is processed to select a set of nodes. The nodes may be identified as source nodes and destination nodes of the edges of the graph. In one embodiment, the selection of nodes may include nodes that include edges with a specific transaction type.

In one embodiment, the graph is a first graph that corresponds to a first transaction type of the multitude of transactions. A second set of nodes may be selected for a second graph that corresponds to a second transaction type. The different graphs may be generated and analyzed independently. The selection of the transaction type may be identified in a request for a listing of entity identifiers received from a user device.

At Step 208, source ranks of the nodes are processed to update the source ranks. The source rank of a node is calculated using a subset of indegree values and a subset of outdegree edges. In one embodiment, the source rank is calculated with a subset of source ranks of a subset of nodes.

In one embodiment, the subset of source ranks is divided by the subset of indegree values of the subset of nodes. In one embodiment, the nodes of the subset of nodes are connected to the node by the subset of outdegree edges.

In one embodiment, the source ranks are processed using the following steps.

The source ranks are set to initial rank values (e.g., 1 or 1/n, where n is the total number of nodes in a graph). The edge values of the edges are updated using the source ranks. The source ranks are then updated using the multitude of edge values. The edge values and the source ranks are repeatedly updated until a change threshold is met.

In one embodiment, the source ranks are processed using the following steps of which the code below is an example using graph scripted query language (GSQL) (different languages and different code implementations may be used). The source ranks are set to initial rank values (e.g., line 5 of the code below). Subsequent ranks are generated using the source ranks (e.g., line 18 of the code below). The source ranks are set to the subsequent ranks (e.g., line 20 of the code below). Generating the subsequent ranks and setting the source ranks to the subsequent ranks is repeated until a change threshold is met (e.g., lines 14 through 22 of the code below).

```
1   CREATE QUERY source_rank(FLOAT max_change=0.001, INT
    max_iter=25) FOR GRAPH test_graph syntax v2{
2
3   MaxAccum<FLOAT> @@max_diff = 9999; # max score change
    in an iteration
4   SumAccum<FLOAT> @recvd_score = 0; # sum of scores each
    vertex receives FROM neighbors
5   SumAccum<FLOAT> @score = 1; # initial score for every vertex
    is 1.
6   SumAccum<FLOAT> @total_wt;
7
8     # Calculate the total weight for each vertex
9   Start = SELECT t
10          FROM Company:s -((LINK>):e) - Company:t
11          ACCUM t.@total_wt += e.weight;
12
13  WHILE @@max_diff > max_change LIMIT max_iter DO
14          @@max_diff = 0;
15          V = SELECT s
16            FROM Company:s -(LINK>:e)- Start:t
17            ACCUM s.@recvd_score += t.@score * e.weight/t.@total_wt
              ###NOTE sums the outdegree edge values for nodes s using the
              indegree edge values of nodes t
18            POST-ACCUM @@max_diff += abs(t.@score -
              t.@recvd_score)), ###NOTE sums differences for all nodes
19            t.@score = t.@recvd_score,
20            t.@recvd_score = 0;
21  END;
22
23  V = SELECT s FROM Company:s
24          POST-ACCUM s.source_page_score = s.@recvd_score;
25  }
```

At Step 210, a set of identifiers for a set of entities represented by the multitude of nodes is presented. The identifiers may be sorted using the source ranks that correspond to the nodes and entities. In one embodiment, one identifier corresponds to one entity, which corresponds to one node, which has one source rank. In one embodiment, the identifiers are presented by transmitting the identifiers to a user device, which displays the identifiers to a user.

In one embodiment, the identifiers are presented using a first set of source ranks corresponding to a first transaction type. In one embodiment, the identifiers are presented using a second set of source ranks corresponding to a second transaction type. The list of identifiers may include multiple columns for different source ranks based on different transaction types and a user may select between displaying entities sorted based on the first set of source ranks or sorted based on the second set of source ranks. Multiple lists of identifiers may be present by transmitting and displaying different lists with each list corresponding to one of the types of transactions (at sets of source ranks).

In one embodiment, a selection of an identifier is received. A message is then transmitted using the identifier. The message may be one of an email, a text message, and a social media message. In one embodiment, the message may be an offer to the entity corresponding to the identifier.

In one embodiment, the identifiers, the corresponding entities, or both may be presented with geographic identifiers. For example, each entity may be identified with an icon on a map displayed on a user device. The icon may be displayed at the geographic location of the entity and include the source rank of the entity.

FIGS. 3A, 3B, 3C, 3D, and 3E show examples of implementing source rank metrics that measure sources of influence. Different embodiments may use different implementations.

Turning to FIG. 3A, the list (300) includes the records A (303), B (304), C (305), D (306), and E (307). The records A (303), B (304), C (305), D (306), and E (307) each include structured text. For example, the record A (303) includes the structured text (309). In one embodiment, the list (300) may be displayed on a client device with the column header (302) (labeled as "transaction data").

The structured text (309), (310), (311), (312), and (313) of the records A (303), B (304), C (305), D (306), and E (307) identify information that describes the transactions being analyzed by the system. For example, the structured text (309) indicates that an amount of 28.92 was transferred from the source entity named "Thomas A. Anderson" to the target entity named "Apple Groceries" using a payment platform identified as "mobile_payment".

Additional data may be included in the records A (303), B (304), C (305), D (306), and E (307) that are not displayed in the list (300). For example, the date of the transaction and the geographical locations of the entities may be included in the records but not displayed in the list (300).

The list (300) may be generated in response to a request from a client device to display a list of entities sorted by the influence of the entitles. The influence may be quantified by the source rank of the entities. To calculate the source ranks of the entities, the system processes the transactions described by the records A (303), B (304), C (305), D (306), and E (307) of the list (300) to identify the nodes and edges of a graph. The list (300) may be processed by mapping the entities and transactions from within the list (300) to the nodes and edges of a graph. The unique entities identified from the data in the list (300) are mapped to the nodes A (323), B (324), C (325), D (326), and E (327) of FIG. 3B. The transactions identified from the list (300) are mapped to the edges A (345), B (346), C (347), and D (348) of FIG. 3C.

Turning to FIG. 3B, the list (320) includes the nodes A (323), B (324), C (325), D (326), and E (327). The nodes A (323), B (324), C (325), D (326), and E (327) each include an entity name For example, the node A (323) includes the entity name (329) ("Trinity Farms"). In one embodiment, the list (300) may be displayed on a client device with the column header (322) (labeled as "entity name").

The entity names (329), (330), (331), (332), and (333) of the nodes A (323), B (324), C (325), D (326), and E (327) are extracted as the unique entity names from the list. For example, the entity name "Apple Groceries" appears as a target entity in the record A (303) and as a source entity in the record D (306) and corresponds to the node D (326).

Turning to FIG. 3C, the list (340) includes the edges A (345), B (346), C (347), and D (348). The edges A (345), B (346), C (347), and D (348) each identify a source node, a target node, and a weight. For example, the edge A (345) has a source node of node C (325), a target node of node D (326), and a weight of "28.92". The edges B (346), C (347), and D (348) respectively include the weights (354) ("13.37"), (357) ("1064.36"), and (360) ("836.67"). In one embodiment, the list (340) may be displayed on a client device with the column headers (342) (labeled as "source node"), (343) (labeled as "target node"), and (344) (labeled as "weight").

The source nodes and target nodes identified by the edges A (345), B (346), C (347), and D (348) refer to the nodes A (323), B (324), C (325), D (326), and E (327) of FIG. 3B. The weights identified by the edges A (345), B (346), C (347), and D (348) are the amounts of the transactions from the records A (303), B (304), C (305), and D (306).

The edges A (345), B (346), C (347), and D (348) respectively correspond to the records A (303), B (304), C (305), and D (306) (of FIG. 3A). The record E (307) does not have a corresponding transaction in the list (340) because the type of the transaction of the record E (307) is a credit card type instead of a mobile payment type.

Turning to FIG. 3D, the graph (365) formed from the nodes A (323), B (324), C (325), D (326), and E (327) and the edges A (345), B (346), C (347), and D (348) is processed to generate source ranks for the entities corresponding to the nodes A (323), B (324), C (325), D (326), and E (327). In one embodiment, the graph (365) may be displayed on a client device.

At Step 1 (367), an initial source rank is set for the nodes A (323), B (324), C (325), D (326), and E (327) of the graph (365). The initial source rank is set to 1. Different embodiments may use different initial values. For example, 1/n may be used where n is the total number of nodes. With 5 nodes, the initial value would be 0.2.

At Step 2 (368), the edge values of the edges A (345), B (346), C (347), and

D (348) of the graph (365) are updated based on the initial source ranks. The updates are in accordance with Equation 1 above. For example, the edge (347) is updated with the edge value of 0.5 calculated by dividing the source rank of the node (323) by the number of ingress edges (2) to the node (323).

At Step 3 (369), the source ranks of the nodes A (323), B (324), C (325), D (326), and E (327) of the graph (365). The updates are in accordance with Equation 1 above. For example, the source rank ("2") of the node (325) is calculated as the sum of the values of the outdegree edges (345) ("1") and (346) ("1").

In one embodiment, Steps 2 and 3 may be repeated multiple times. In one embodiment, Steps 2 and 3 are repeated until the sum of the changes of the source ranks of the nodes A (323), B (324), C (325), D (326), and E (327) satisfies (e.g., exceeds) a change threshold.

Turning to FIG. 3E, the list (380) identifies the source ranks, nodes, and entity names for the transactions from the records A (303) through E (307) (of FIG. 3A). In one embodiment, the list (380) is displayed on a client device in response to a request from the client device. In one embodiment, the list (380) may be displayed on a client device with the column headers (381) (labeled as "source rank"), (382) (labeled as "node"), and (383) (labeled as "entity name").

The list (380) is sorted by the values of the source ranks (385), (386), (387), (388), and (389). The rows of the list (380) identify the correspondence between the source ranks, the nodes, and the entity names identified by the system. For example, the source rank (385) ("2") corresponds to the node C (325) having the entity name (331) "Thomas A. Anderson".

In one embodiment, the system may provide additional contact information for the entities identified in the list (380). In one embodiment, the system may automatically send a message to the highest ranked entity from the list (380).

Embodiments of the invention may be implemented on a computing system. Any combination of a mobile, a desktop, a server, a router, a switch, an embedded device, or other types of hardware may be used. For example, as shown in FIG. 4A, the computing system (400) may include one or more computer processor(s) (402), non-persistent storage (404) (e.g., volatile memory, such as a random access memory (RAM), cache memory), persistent storage (406) (e.g., a hard disk, an optical drive such as a compact disk (CD) drive or a digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) (402) may be one or more cores or micro-cores of a processor. The computing system (400) may also include one or more input device(s) (410), such as a touchscreen, a keyboard, a mouse, a microphone, a touchpad, an electronic pen, or any other type of input device.

The communication interface (412) may include an integrated circuit for connecting the computing system (400) to a network (not shown) (e.g., a local area network (LAN), a wide area network (WAN) such as the Internet, a mobile network, or any other type of network) and/or to another device, such as another computing device.

Further, the computing system (400) may include one or more output device(s) (408), such as a screen (e.g., a liquid crystal display (LCD), a plasma display, a touchscreen, a cathode ray tube (CRT) monitor, a projector, or other display device), a printer, an external storage, or any other output device. One or more of the output device(s) (408) may be the same or different from the input device(s) (410). The input and output device(s) (410 and (408)) may be locally or remotely connected to the computer processor(s) (402), non-persistent storage (404), and persistent storage (406). Many different types of computing systems exist, and the aforementioned input and output device(s) (410 and (408)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system (400) shown in FIG. 4A, or a group of nodes combined may correspond to the computing system (400) shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Figure 4B:
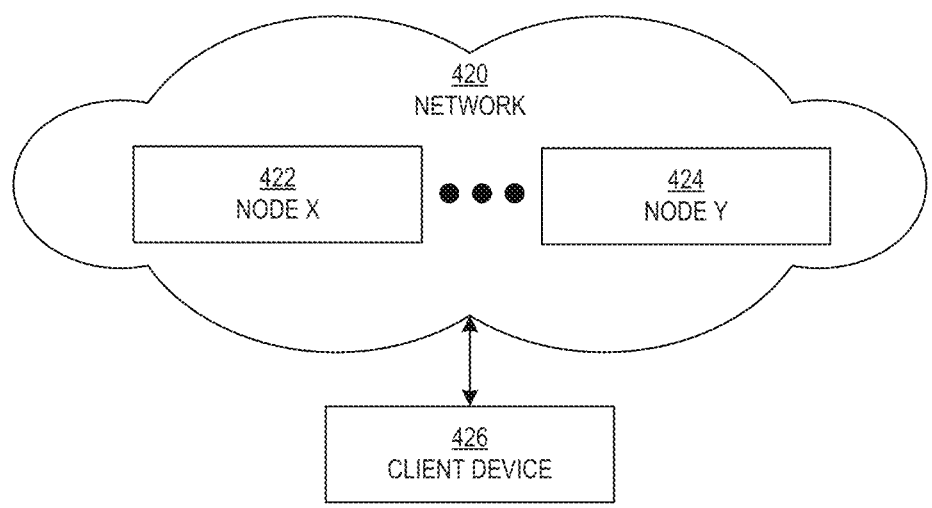

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system (400) shown in FIG. 4A. Further, the client device (426) may include and/or perform all or a portion of one or more embodiments of the invention.

The computing system (400) or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object.

The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (400) in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (400) of FIG. 4A, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A−B), and the status flags may be read to determine if the result is positive (i.e., if $A>B$, then A−B>0). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (400) in FIG. 4A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (400) of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (400) of FIG. 4A and the nodes (e.g., node X (422), node Y (424)) and/or client device (426) in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
processing a plurality of transactions to generate a graph, wherein the graph is a directed graph;
processing the graph to select a plurality of nodes, wherein a node of the plurality of nodes is identified as one or more of a source node and a destination node of an edge of a plurality of edges of the graph;
processing a plurality of source ranks, of the plurality of nodes, to update the plurality of source ranks, wherein the plurality of source ranks comprises a source rank of the node, wherein the source rank is calculated using a subset of indegree values and a subset of outdegree edges; and
presenting a plurality of identifiers, of a plurality of entities represented by the plurality of nodes, sorted using the plurality of source ranks.

2. The method of claim 1, further comprising:
processing the plurality of transactions, wherein a transaction, of the plurality of transactions, identifies a payment value from a source entity, represented by the source node, to a destination entity, represented by the destination node.

3. The method of claim 1, further comprising:
processing the graph to select the plurality of nodes, wherein the graph is a first graph and wherein the first graph corresponds to a first transaction type of the plurality of transactions; and
processing a second graph to select a second plurality of nodes, wherein the second graph corresponds to a second transaction type.

4. The method of claim 1, further comprising:
presenting the plurality of identifiers using the plurality of source ranks, wherein the plurality of source ranks is a first plurality of source ranks corresponding to a first transaction type of the plurality of transactions; and
presenting the plurality of identifiers using a second plurality of source ranks, wherein the second plurality of source ranks corresponds to a second transaction type of the plurality of transactions.

5. The method of claim 1, further comprising:
processing the plurality of source ranks by:
setting the plurality of source ranks to a plurality of initial rank values;
updating a plurality of edge values, of the plurality of edges, using the plurality of source ranks;
updating the plurality of source ranks using the plurality of edge values; and
repeatedly updating the plurality of edge values and the plurality of source ranks until a change threshold is met.

6. The method of claim 1, further comprising:
processing the plurality of source ranks by:
- setting the plurality of source ranks to a plurality of initial rank values;
- generating a plurality of subsequent ranks using the plurality of source ranks;
- setting the plurality of source ranks to the plurality of subsequent ranks; and
- repeatedly generating the plurality of subsequent ranks and setting the plurality of source ranks to the plurality of subsequent ranks until a change threshold is met.

7. The method of claim 1, wherein the source rank is calculated with a subset of source ranks of a subset of nodes,
- wherein the subset of source ranks is divided by the subset of indegree values of the subset of nodes, and
- wherein the nodes of the subset of nodes are connected to the node by the subset of outdegree edges.

8. The method of claim 1, further comprising:
- receiving a selection of an identifier of the plurality of identifiers; and
- transmitting a message using the identifier.

9. The method of claim 1, further comprising:
presenting the plurality of identifiers, of the plurality of entities, with a plurality of geographic identifiers.

10. The method of claim 1, further comprising:
transmitting a message using an identifier selected from the plurality of identifiers, wherein the message comprises one of an email, a text message, and a social media message.

11. A system comprising:
a graph controller configured to process a plurality of transactions;
an interface controller configured to generate a response comprising a plurality of identifiers;
a modeling application executing on one or more servers and configured for:
- processing, by the graph controller, the plurality of transactions to generate a graph, wherein the graph is a directed graph;
- processing the graph to select a plurality of nodes, wherein a node of the plurality of nodes is identified as one or more of a source node and a destination node of an edge of a plurality of edges of the graph;
- processing a plurality of source ranks, of the plurality of nodes, to update the plurality of source ranks, wherein the plurality of source ranks comprises a source rank of the node, wherein the source rank is calculated using a subset of indegree values and a subset of outdegree edges; and a server application executing on one or more servers and configured for:
- presenting, by the interface controller, the plurality of identifiers, of a plurality of entities represented by the plurality of nodes, sorted using the plurality of source ranks.

12. The system of claim 11, wherein the modeling application is further configured for:
processing the plurality of transactions, wherein a transaction, of the plurality of transactions, identifies a payment value from a source entity, represented by the source node, to a destination entity, represented by the destination node.

13. The system of claim 11, wherein the modeling application is further configured for:
processing the graph to select the plurality of nodes, wherein the graph is a first graph and wherein the first graph corresponds to a first transaction type of the plurality of transactions; and
processing a second graph to select a second plurality of nodes, wherein the second graph corresponds to a second transaction type.

14. The system of claim 11, wherein the server application is further configured for:
presenting the plurality of identifiers using the plurality of source ranks, wherein the plurality of source ranks is a first plurality of source ranks corresponding to a first transaction type of the plurality of transactions; and
presenting the plurality of identifiers using a second plurality of source ranks, wherein the second plurality of source ranks corresponds to a second transaction type of the plurality of transactions.

15. The system of claim 11, wherein the modeling application is further configured for:
processing the plurality of source ranks by:
- setting the plurality of source ranks to a plurality of initial rank values;
- updating a plurality of edge values, of the plurality of edges, using the plurality of source ranks;
- updating the plurality of source ranks using the plurality of edge values; and
- repeatedly updating the plurality of edge values and the plurality of source ranks until a change threshold is met.

16. The system of claim 11, wherein the modeling application is further configured for:
processing the plurality of source ranks by:
- setting the plurality of source ranks to a plurality of initial rank values;
- generating a plurality of subsequent ranks using the plurality of source ranks;
- setting the plurality of source ranks to the plurality of subsequent ranks; and
- repeatedly generating the plurality of subsequent ranks and setting the plurality of source ranks to the plurality of subsequent ranks until a change threshold is met.

17. The system of claim 11,
wherein the source rank is calculated with a subset of source ranks of a subset of nodes,
wherein the subset of source ranks is divided by the subset of indegree values of the subset of nodes, and
wherein the nodes of the subset of nodes are connected to the node by the subset of outdegree edges.

18. The system of claim 11, wherein the server application is further configured for:
receiving a selection of an identifier of the plurality of identifiers; and transmitting a message using the identifier.

19. The system of claim 11, wherein the server application is further configured for:
presenting the plurality of identifiers, of the plurality of entities, with a plurality of geographic identifiers.

20. A method comprising:
transmitting a request;
displaying a plurality of identifiers received in a response to the request, wherein the plurality of identifiers is sorted using a plurality of source ranks and the plurality of source ranks are generated by:
- processing a plurality of transactions to generate a graph, wherein the graph is a directed graph;
- processing the graph to select a plurality of nodes, wherein a node of the plurality of nodes is identified as one or more of a source node and a destination node of an edge of a plurality of edges of the graph; and processing a plurality of source ranks, of the plurality of nodes, to update the plurality of source ranks, wherein the plurality of source ranks comprises a source rank of the node, wherein the source rank is calculated using a subset of indegree values and a subset of outdegree edges.

* * * * *